Dec. 27, 1966 W. F. CALDWELL ETAL 3,294,909

ELECTRONIC ANALOG EAR

Filed Dec. 19, 1962 3 Sheets-Sheet 1

INVENTORS
WILLIAM F. CALDWELL
EWALD GLAESSER
JOHN L. STEWART
BY Meyers & Peterson
ATTORNEYS

ELECTRONIC ANALOG EAR

Filed Dec. 19, 1962

3 Sheets-Sheet 2

INVENTORS
WILLIAM F. CALDWELL
EWALD GLAESSER
JOHN L. STEWART

BY *Meyers & Peterson*
ATTORNEYS

INVENTORS
WILLIAM F. CALDWELL
EWALD GLAESSER
JOHN L. STEWART
BY
*Meyers & Peterson*
ATTORNEYS United States Patent Office 3,294,909
Patented Dec. 27, 1966

3,294,909
ELECTRONIC ANALOG EAR

William F. Caldwell, 5823 E. 18th St., Tucson, Ariz. 85711; Ewald Glaesser, 630 N. 4th Ave., Tucson, Ariz. 85705; and John L. Stewart, 2530 N. Santa Lucia Ave., Tucson, Ariz. 85715

Filed Dec. 19, 1962, Ser. No. 245,697
20 Claims. (Cl. 179—1)

This invention relates generally to a system for modeling an animal ear, and pertains more particularly to an electric analog ear for performing the modeling operation.

The object of this invention is to simulate the hearing system of an animal, more specifically that of a human being, by providing electrical circuitry that will allow a relatively complete analog modeling of the acoustic effects of the head and the outer ear, the mechanical motions of the middle ear and cochlea, and the neural activity of the neural structure of the cochlea and the auditory regions of the central nervous system, with emphasis placed on the role of the cochlea and the neural structure.

The electrical analog ear provides continuous electrical signals which are in accordance with the sound being analyzed. Neural activity in the central nervous system is represented by a set of monopolar signals so as to provide a spatial pattern of neural activity. Interpretation of this pattern, which varies relatively slowly if the sound is other than sustained, provides various measures of animal subjective discrimination. It is within the purview of this invention to process the information contained in the pattern of neural activity in various ways depending upon the type of study being made and the particular data that is sought. For instance, it is within the contemplation of the invention to provide a measure of subjective loudness by summing the individual signals composing the pattern or to provide for sound recognition by recognition of the pattern by devices of various types.

Briefly, the invention envisages the use of an audio amplifier for driving a network representative of the outer ear which is coupled to a network corresponding to the middle ear. The middle ear is in turn connected to a network representative of the cochlea comprising a multi-section, lumped-parameter, non-uniform transmission line. The neural structure of the cochlea and of auditory portions of the nervous system is modeled functionally by means of detecting and filtering amplifiers termed loudness converters, one for each of the transmission line sections. The outputs from the various loudness converters constitute the pattern of neural activity and are processed in a fashion dependent upon the specific information desired, such as the production of a repetitive waveform for display on a conventional oscilloscope.

From the foregoing, it will be apparent that our invention will find utility in various fields, such as in communications involving speech recognition and bandwidth compression; medicine involving diagnostic problems and surgical predictions; training involving the study of basic speech sounds and training assistance; audiometry; speech; waveform studies when sounds of various types are to be analyzed; design of hearing aids; sound field surveys; and other situations where the analysis of sound is important.

Other objects and advantages of our invention will more fully appear from the following description, made in connection with the accompanying drawings, wherein like reference characters refer to the same or similar parts throughout the several views and in which.

Figure 1:
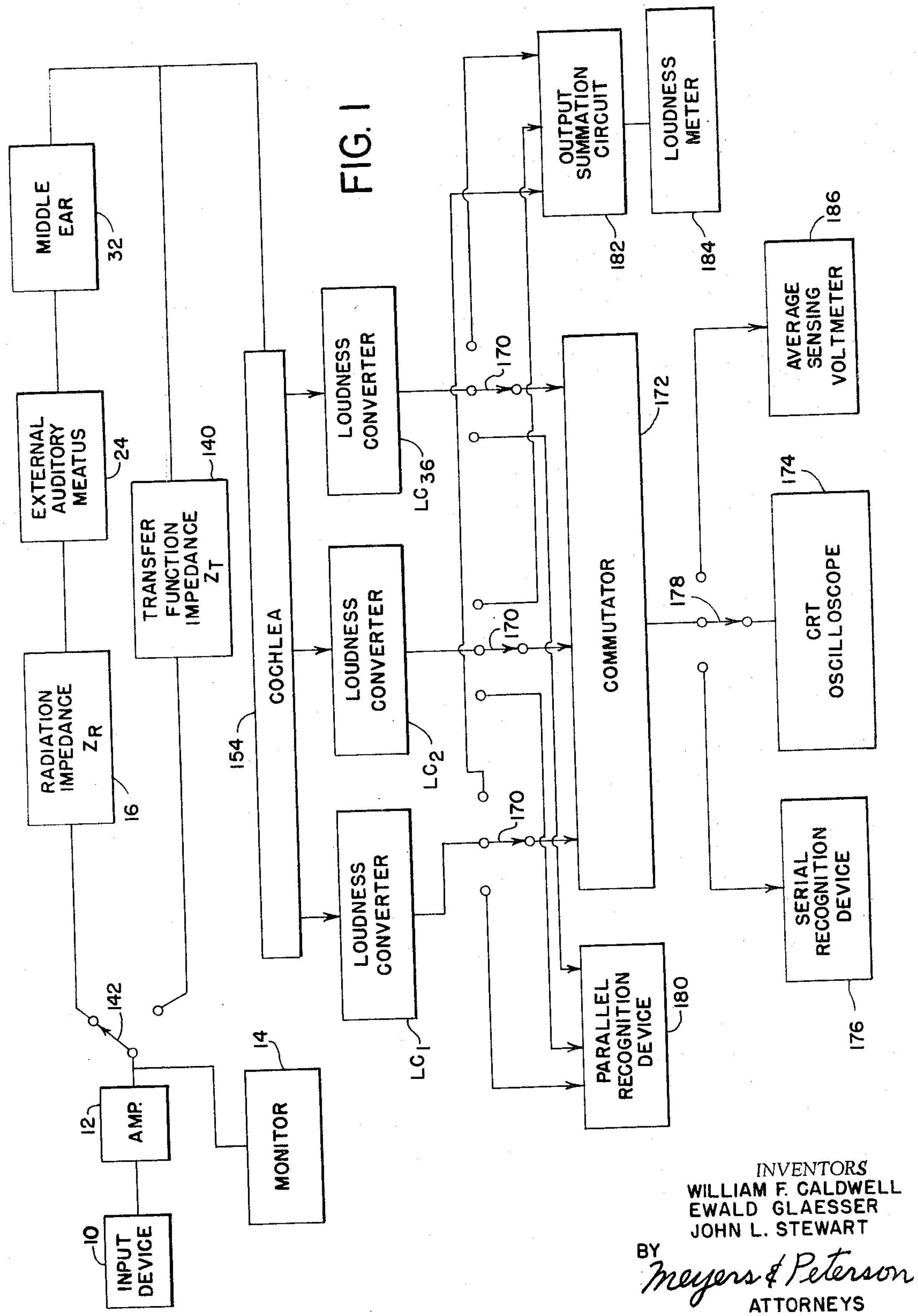
FIGURE 1 is a block diagram of the electric analog ear with certain processing equipment added.

Referring first to FIGURE 1, an input device 10, such as a microphone or tape deck, serves as the means for delivering an appropriate electrical signal that has been transduced or converted from the sound to be analyzed to an audio amplifier 12 capable of raising the electrical signal to a level sufficient to drive the analog ear. If desired, a monitoring device 14 can be connected to the output side of the amplifier 12, which device may assume the form of a speaker or oscilloscope.

A block 16 denotes the radiation impedance which results from the effects of the head and pinna. While the employment of the analog radiation impedance is discretionary, depending largely upon the type of study being conducted and the refinement of analysis, this impedance has been simply represented in FIGURE 2 by a series RC circuit including a resistor 18 and capacitor 22.

Although the present invention is not limited to the simulation of a human ear, it can be explained at this point that the hman external auditory meatus is a tube having an average length of 2.7 cm., an area of 0.3 to 0.5 sq. cm., and is terminated by the tympanic membrane. The meatus denoted by the block 24 is modeled on a direct analog basis by assuming it to be a uniform tube in which plane waves exist and in which friction effects at the walls are negligible, and then by realizing this assumed configuration with the inductors 26, 28 and capacitors 30 set forth in FIGURE 2. The electrical model 24 of the external meatus, therefore, consists of a lumped parameter, uniform, lossless transmission line having the typical values assigned in FIGURE 2.

Figure 2:
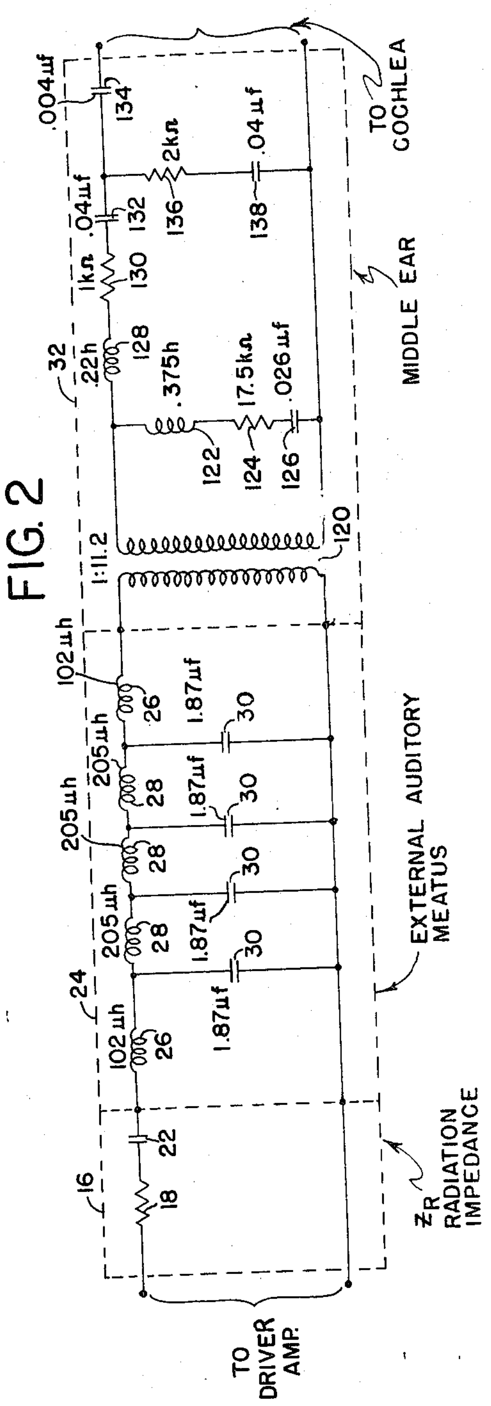
FIGURE 2 is a schematic diagram of the circuitry constituting the radiation impedance, outer ear and middle ear analogs.

As for the human middle ear, it is presumed to consist of the tympanic membrane which terminates the external meatus, the middle ear cavity, ossicles (malleus, incus, and stapes) which are enclosed in the cavity and serve to transmit motions of the tympanic membrane to the cochlea or inner ear, and the oval and round windows which close the openings to the cochlea. The block 32 (FIGURE 1) denoting the middle ear is modeled by assuming an idealized linear mechanical-acoustical configuration and realizing this configuration with electrical components. A simplified form of the analog is shown in FIGURE 2.

Figure 3:
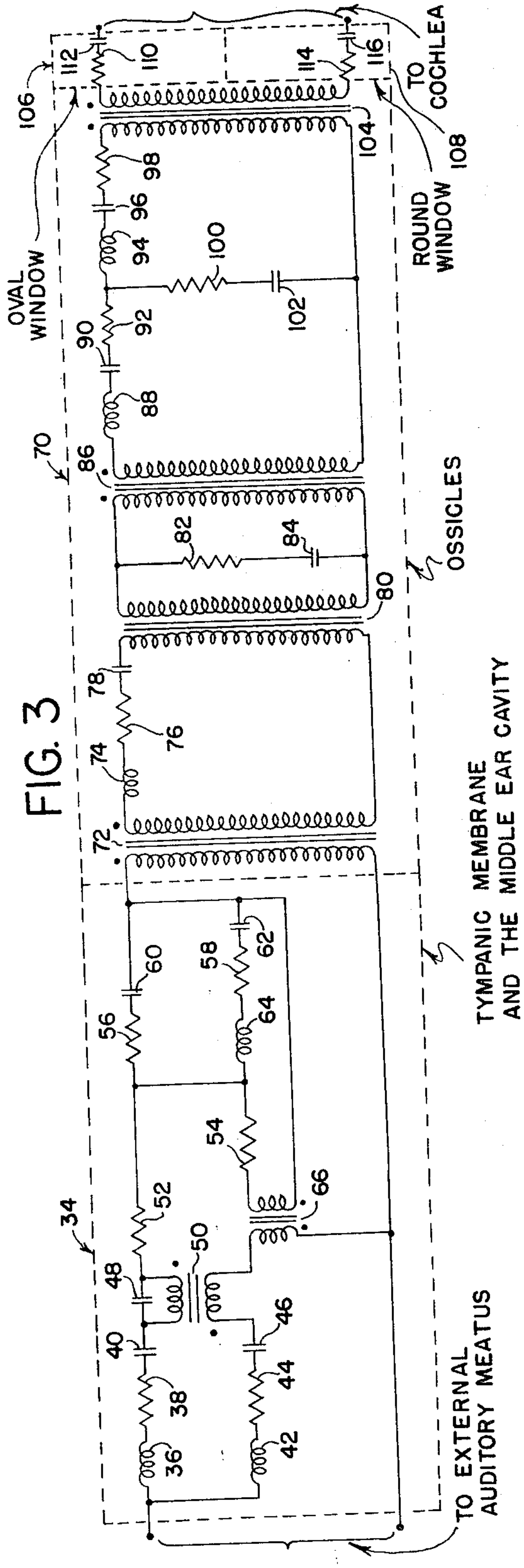
FIGURE 3 shows one detailed analog circuit representative of the tympanic membrane and the middle ear cavity as well as including an electrical analog of the ossicles and the cochlear windows.

Detailed analog circuitry for the middle ear 32, developed on a one-to-one basis, is shown in FIGURE 3. FIGURE 3 shows a pressure-voltage, volume velocity-current analog of the tympanic membrane and the middle ear cavity denoted by the dashed block 34. The inductance, resistance and capacitance, indicated by the reference numerals 36, 38 and 40, respectively, represent the mass, friction and elasticity of the section of the tympanic membrane which is fastened to the malleus, and the inductance, resistance and capacitance, indicated by the reference numerals 42, 44 and 46, respectively, represent the mass, friction and elasticity of the remaining part of the membrane. The coupling between the two sections of the membrane, due to the membrane, is represented by the capacitor 48 and the transformer 50. The loading of the air cavity upon the tympanic membrane sections and the coupling between the sections due to the air cavity is represented by the remaining resistances 52, 54, 56 and 58, capacitances 60 and 62, inductance 64 and transformer 66.

The ossicles act as a set of mechanical levers which provide a force amplification of about 1:1.3 between the tympanic membrane and the oval window. The malleus fastens to the tympanic membrane. The malleus and the incus are united by a stiff joint and are supported by several ligaments. The stapes is connected to the long process of the incus by means of a flexible joint. The footplate of the stapes nearly closes the oval window and is connected to the bone surrounding the window by means of a flexible annular ligament. Under normal conditions, motion of the tympanic membrane causes a rotation of the ossicles about an axis which is located at approximately their center of gravity, thus causing a motion of the stapes and hence a transmission of sound energy to the cochlea.

The electrical analog for the ossicles and the cochlear windows is also shown in FIGURE 3. It will be observed that the analog circuit diagram for the ossicles has been indicated by the reference numeral 70. This circuit includes a transformer 72 to which is connected an inductance 74, a resistance 76 and a capacitance 78 which collectively represent the malleus and associated ligaments and tensor tympanic muscle. The primary of a second transformer 80 is connected to the foregoing components and its secondary has a resistance 82 and capacitance 84 connected thereacross in order to simulate the incudo-malleolar joint. A third transformer 86 is employed and serves to couple the preceding elements to an inductance 88, a capacitance 90 and a resistance 92 which together correspond to the incus and associated ligaments. There is another inductance 94, a capacitance 96 and a resistance 98 functioning as the stapes and stapedius muscle. In a T relation with the components 88–98 is a resistance 100 and a capacitance 102 assuming the role of the incudo-stapedial joint. The foregoing T circuitry is connected to a transformer 104 which completes the analog constituting the ossicles 70.

However, the middle ear additionally includes an oval window and a round window. Accordingly, the simulated windows have been assigned the reference numerals 106 and 108, respectively, in FIGURE 3. The circuitry 106, it will be discerned, comprises a resistance 110 and a capacitance 112, whereas the circuitry 108 includes a resistance 114 and a capacitance 116.

By making suitable approximations in the circuitry of FIGURE 3, together with the combining of the transformers 72, 80, 86 and 104, the complete middle ear circuit 32 can be reduced to that shown at the right in FIGURE 2. This circuit simulates the input impedance and transfer function of a normal human ear and includes a transformer 120 coupled to the external meatus circuit 24. Connected across the secondary of the transformer 120 is an inductance 122, a resistance 124 and a capacitance 126. In series with the secondary of the transformer 120 is an inductance 128, a resistance 130, a first capacitance 132 and a second capacitance 134. Connected in parallel between the juncture of the two capacitances 132, 134 is a resistance 136 and a capacitance 138. While the components 120–138 provide a good approximation of the middle ear, it is to be noted, however, that some uses may require the more detailed analog of FIGURE 3.

In the human ear, the impedance transformation ratio (which corresponds to the impedance transformation ratio of the combined transformers of FIGURE 2) is 1:500. However, in the analog, the impedance level of the radiation impedance and the outer ear are lowered by a factor of 10 so as to match the output impedance of the amplifier 12. The middle ear analog (with transformers combined, as shown in FIGURE 2) is referred to the impedance level of the analog cochlea, which is below the impedance level of the human cochlea by a factor of 40. These impedance level changes are accommodated in the middle ear transformer, resulting in an impedance ratio of 1:125 or a voltage (pressure) ratio of 1:11.2.

For study of cases where the direct analogs of the outer and middle ears are not required, the units 24 and 32 (and the unit 16 if included) can be replaced with a single unit which models these portions of the ear on a functional basis so as to provide substantially the correct transfer function. This unit has been simply called a transfer function impedance in FIGURE 1 and has been assigned the reference numeral 140. A switch 142 permits its facile substitution for the units 16, 24 and 32. Although the switching arrangement is not specifically shown, it is contemplated that the amplifier be connected to drive the cochlea (described below) directly, through the middle ear 32, through the combined external meatus 24 and middle ear 32, as well as through the external meatus and middle ear and the radiation impedance 16.

Figure 4:
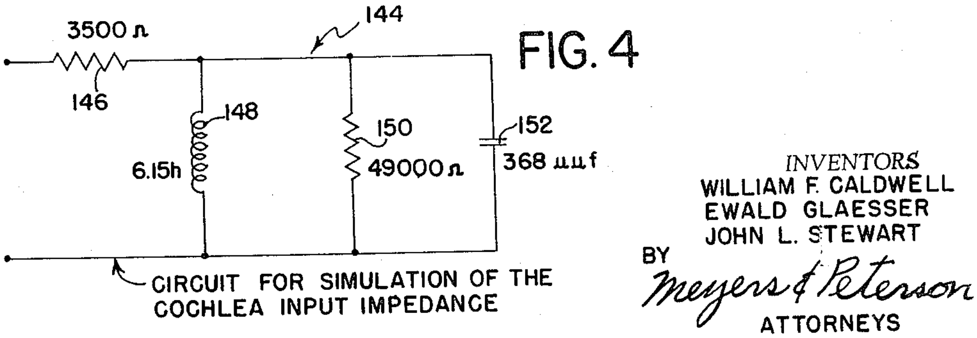
FIGURE 4 is a circuit for the simulation of the cochlea input impedance.

In certain studies of the middle ear, only use of analogs up to but not including the cochlea is demanded. Since the cochlea provides a certain loading effect on the middle ear circuit, removal of the accurate (and relatively costly and bulky) representations for the cochlea must be accounted for with a simplified circuit which provides an equivalent loading effect. This simplified circuit is referred to as a "dummy" cochlea. A suitable dummy network 144 is shown in FIGURE 4 which includes a resistance 146, an inductance 148, a resistance 150 and a capacitance 152, the latter three components being connected in parallel with each other.

Figure 5:
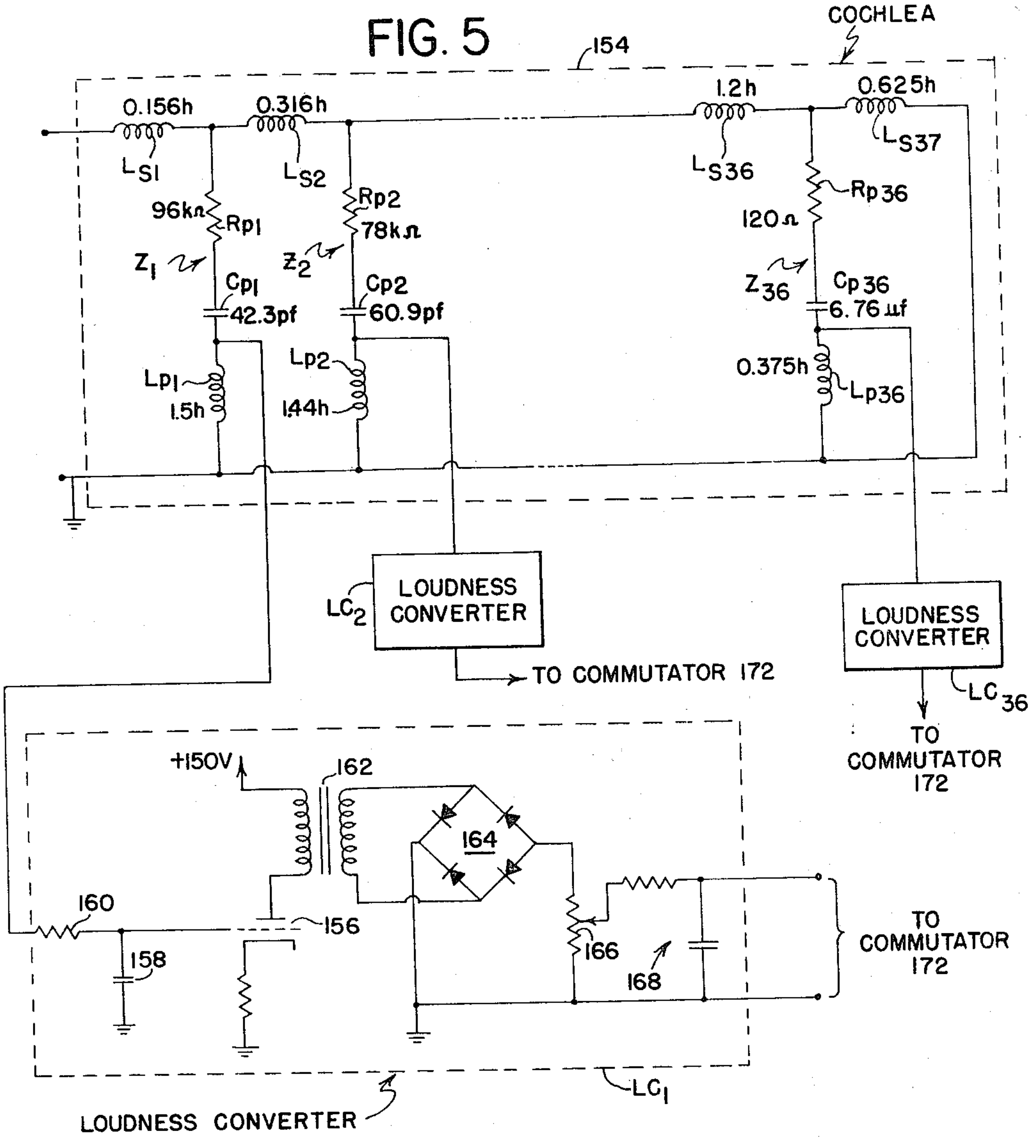
FIGURE 5 is a schematic diagram showing the components comprising several sections of the cochlea and one of the loudness converters, there being one loudness converter connected to each cochlear section.

Before describing the important analog cochlea in detail, which has been designated by the reference numeral 154 in FIGURES 1 and 5, it will be well to preface the description with the explanation that various impedance sections are employed which are representative of various spaced points along the basilar membrane of the human cochlea where mechanical motions occur. For instance, the spacing denoted by each impedance section can be considered to be indicative of an element having a length equal to approximately one millimeter.

Assuming, then, for the sake of discussion that 36 impedance sections are employed, these sections would range from $Z_1$ to $Z_{36}$, three ($Z_1$, $Z_2$ and $Z_{36}$) of which have been shown in FIGURE 5. Each section includes a series inductor $L_s$ having the requisite amount of inductance and resistance therein, a parallel resistor $R_p$, a parallel capacitor $C_p$ and a parallel inductor $L_p$. For completeness, the values of these components for each section are listed in the following table:

| Section Number, X | Resonant Frequency, $F_o$ (c.p.s.) | Series Inductance, $L_s$ (henries) | Parallel Inductance, $L_p$ (henries) | Parallel Resistance, $R_p$ (ohms) | Parallel Capacitance, $C_p$ |
|---|---|---|---|---|---|
| 1 | 20,000 | 0.156 | 1.50 | 96,000 | 42.3 pf. |
| 2 | 17,000 | 0.316 | 1.44 | 78,000 | 60.9. |
| 3 | 14,700 | 0.322 | 1.38 | 65,100 | 84.8. |
| 4 | 12,600 | 0.330 | 1.33 | 53,700 | 120. |
| 5 | 10,800 | 0.338 | 1.28 | 44,200 | 169. |
| 6 | 9,300 | 0.346 | 1.24 | 36,600 | 239. |
| 7 | 8,000 | 0.354 | 1.18 | 30,250 | 336. |
| 8 | 6,900 | 0.361 | 1.14 | 25,100 | 469. |
| 9 | 5,900 | 0.372 | 1.09 | 20,600 | 666. |
| 10 | 5,100 | 0.382 | 1.05 | 17,120 | 928. |
| 11 | 4,350 | 0.392 | 1.01 | 14,050 | 1,330. |
| 12 | 3,750 | 0.403 | 0.970 | 11,600 | 1,790. |
| 13 | 3,210 | 0.415 | 0.932 | 9,580 | 2,640. |
| 14 | 2,770 | 0.427 | 0.986 | 7,940 | 3,690. |
| 15 | 2,400 | 0.440 | 0.960 | 6,610 | 5,110. |
| 16 | 2,050 | 0.454 | 0.828 | 5,440 | 7,290. |
| 17 | 1,750 | 0.468 | 0.795 | 4,450 | 9,670. |
| 18 | 1,510 | 0.483 | 0.765 | 3,700 | 0.0145 μf. |
| 19 | 1,300 | 0.500 | 0.734 | 3,050 | 0.0204. |
| 20 | 1,100 | 0.518 | 0.706 | 2,490 | 0.0297. |
| 21 | 960 | 0.537 | 0.678 | 2,060 | 0.0406. |
| 22 | 825 | 0.558 | 0.651 | 1,720 | 0.0572. |
| 23 | 710 | 0.580 | 0.626 | 1,420 | 0.0804. |
| 24 | 610 | 0.604 | 0.602 | 1,175 | 0.113. |
| 25 | 525 | 0.630 | 0.579 | 986 | 0.161. |
| 26 | 450 | 0.659 | 0.560 | 801 | 0.225. |
| 27 | 388 | 0.690 | 0.535 | 665 | 0.315. |
| 28 | 335 | 0.724 | 0.515 | 552 | 0.440. |
| 29 | 287 | 0.762 | 0.494 | 454 | 0.624. |
| 30 | 246 | 0.803 | 0.471 | 371 | 0.900. |
| 31 | 210 | 0.850 | 0.458 | 307 | 1.24. |
| 32 | 182 | 0.903 | 0.440 | 256 | 1.72. |
| 33 | 156 | 0.963 | 0.422 | 208 | 2.47. |
| 34 | 135 | 1.03 | 0.406 | 176 | 3.42. |
| 35 | 116 | 1.11 | 0.390 | 145 | 4.83. |
| 36 | 100 | 1.20 | 0.375 | 120 | 6.76. |
| 37 | --- | .625 | --- | --- | --- |

From the foregoing information, it can be discerned that the mechanical structure of the cochlea is modeled on a direct basis and converted to an unbalanced form. The series inductors $L_s$ and the resistance included therein represent the mass and friction of the fluid in the two scalae of the cochlea. The shunt inductors $L_p$, the shunt resistors $R_p$ and the shunt capacitors $C_p$ represent the mass, friction and elasticity associated with the cochlear duct. Acceleration, velocity or displacement of the basilar membrane is obtained by reading, respectively, the voltages across the shunt inductors, resistors and capacitors. It will be recognized, in this respect, that the acceleration, the velocity and the displacement of the basilar membrane for a sinusoidal excitation of the analog cochlea 154 are each a function of frequency and the distance along the cochlea. Through use of a simple RC cascade low pass circuit, readout can be achieved from shunt inductors $L_p$; where the bandwidth of the RC circuit is 1000 c.p.s., acceleration is read significantly below 1000 c.p.s. and velocity significantly above 1000 c.p.s. With this particular scheme, the proper measure for subjective intensity is acquired; this measure appears to be basilar membrane velocity modified by the neural volley effect below 1000 c.p.s., where volleys provide the effect of differentiation of velocity.

The analog cochlea 154 consists of a 36 section tapered RLC wave propagating structure, producing voltages at 36 points therealong which represent displacement or velocity or acceleration of points along the basilar membrane. The desired voltages are amplified, detected and filtered with 36 loudness converters $LC_1$–$LC_{36}$, each representing the neural structure for about one millimeter along the axis of the cochlear duct. Stated somewhat differently, the neural structure of the cochlea and of auditory portions of the central nervous system is modeled functionally by means of the loudness converters $LC_1$–$LC_{36}$. More specifically, the detection role played by the loudness converters represents the conversion of mechanical excitation to the neural equivalent of mechanical excitation (which is preseumed to be the summation of a large number of individual neural pulses) so that the resulting or built-up waveform is continuous as a good approximation. The output voltages from the loudness converters, which are caused to be slowly varying by virtue of the filtering action, form a spatial pattern of importance with respect to the cortical function of recognition.

Inasmuch as the loudness converters $LC_1$–$LC_{36}$ are identical except for the gain setting, only one such converter need be depicted in detail. Accordingly, attention is now directed to FIGURE 5 where the components of loudness converter $LC_1$ are portrayed. The voltage signal appearing at the point between capacitor $C_{p1}$ and inductor $L_{p1}$, which represents basilar membrane acceleration, is resistance-coupled to an amplifier vacuum tube 156, such as one-half of a 12AX7A tube. A capacitor 158 and a resistor 160 provide low-pass filtering so that the signal at the grid of vacuum tube 156 represents acceleration significantly below 1000 c.p.s. and velocity significantly above 1000 c.p.s. as commented upon before. In the plate circuit of the tube 156 is a transformer 162 having its secondary connected to a full-wave bridge rectifier 164 where the amplified signal is detected. The detected signal is impressed across a potentiometer 166 set for the proper gain. The signal is then fed to an RC filter 168, which filter represents the psychoacoustic phenomenon of temporal auditory summation with a time constant of the order of 0.1 second. Relatively slowly varying waveforms are thus produced at the output sides of the various loudness converters $LC_1$–$LC_{36}$.

To the output side of each of the various loudness converters $LC_1$–$LC_{36}$ is connected a three-way switch 170. As indicated in FIGURE 1, these various switches 170 are positioned so as to connect the loudness converters to a high speed commutator 172 for the purpose of sampling these converter sequentially, thereby converting the spatial pattern, that is, the previously-mentioned relatively slowly varying waveforms, to a series of time patterns. It is desirable that the sampling rate be sufficiently high so that the patterns portray the distinguishable characteristics necessary for speech recognition. To accomplish this objective, a mercury jet commutator is preferred which in practice can sample all 36 sections of the cochlea in 18 milliseconds. A mercury jet commutator that has proved completely satisfactory has been Deltaswitch Model 210 manufactured by Advanced Technology Laboratories, a division of American-Standard.

The temporal sequence provided by the sampling action of the commutator 172 is then displayed on a cathode ray tube oscilloscope 174 by connecting the output terminals of the commutator to the vertical deflection input terminals of the oscilloscope, whereby the repetitive waveform or any changes therein can be easily viewed and studied.

If desired, the same temporal pattern derived via the commutator 172 can be fed to a serial recognition device 176, a switch 178 permitting selection of either the oscilloscope 174 or the recognition device 176. Actually, in some instances, both the oscilloscope 174 and the recognition device 176 will be connected to the commutator 172 and the switch 178 would be modified accordingly. While by no means limited thereto, the recognition device 176 may include means for generating a particular sequence of test sounds, more specifically electrical signals transduced therefrom and means for correlating the signals from the commutator 172 with the intended signal so as to obtain a measure of error.

The particular recognition device need not operate on a serial basis. Instead, cross-correlation may be realized between the incoming sound pattern, more specifically the signals from the loudness converters $LC_1$–$LC_{36}$, and an appropriate dictionary of stored patterns. Accordingly, the three-way switches 170 can be positioned to connect the converters $LC_1$–$LC_{36}$ to a parallel recognition device 180. In this instance, an appropriate memory dictionary or storage of the ideal or standardized signals would be provided for correlation purposes.

Sometimes it will be of advantage to provide a summation of the slowly varying waveforms at the output sides of the loudness converters $LC_1$–$LC_{36}$. Accordingly, the switches 170 can be positioned so as to connect a summing circuit 182 to the various loudness converters. A loudness meter 184 is in turn connected to the summation circuit 182 to provide a visual indication of the loudness. In this regard, it will be appreciated that the output of an individual loudness converter represents the loudness associated with the corresponding segment of the cochlear duct that the particular impedance section $Z_1$–$Z_{36}$ represents. In other words, the meter 184 provides an indication of the over-all effect of the individual loudness characteristics. A similar result obtains upon measuring the average value of the commutated waveform, which can be done with an average-sensing voltmeter 186 at the commutator output.

Having presented the foregoing information, the operation of our analog ear should be readily understood. Quite briefly, the transduced electrical signal from the device 10 is fed to the amplifier 12 which raises the signal strength to a level sufficient to drive the components making up the simulated portions of the ear. With the selector switch 142 in the position shown, the amplified signal is delivered to the radiation impedance 16, then passing through analog external meatus 24 and then the analog middle ear 32. The simulated sound in the form of an electrical signal is transmitted through the analog cochlea 78 and the various impedance sections $Z_1$–$Z_{36}$ of which the cochlea is composed provide electrical signals indicative of actual sound traversing a human cochlea. The loudness converters $LC_1$–$LC_{36}$ by reason of their filtering ability after detection provide slowly varying waveforms that can be studied in several different ways as provided by the commutator 172 and the oscilloscope 174 or serial recognition device 176, the parallel recognition device 180, or the summation circuit 182, as hereinbefore described. Although the switches 170 have been shown as being selective in their operation, it will be understood that, if desired, they should be able to function so as to establish contact between their arms and all of their contacts at once where simultaneous measurement of loudness, commutation, parallel recognition, serial recognition and oscilloscope display is to be achieved.

It will, of course, be understood that various changes may be made in the form, details, arrangements and proportions of the parts without departing from the scope of our invention as set forth in the appended claims.

What is claimed is:

1. An electronic analog ear comprising:

(a) input means for providing an electrical signal in accordance with a sound to be analyzed;

(b) an analog cochlea in circuit with said input means including a predetermined number of resistance-inductance-capacitance sections simulating points along the basilar membrane of an animal cochlea for providing a plurality of electrical signals at said various sections variable in accordance with said input signal and the values of said sections to thus represent motions occurring at said points, and (c) means for deriving slowly varying waveforms indicative of said output signals including a filter connected to each section.

2. An electronic analog ear in accordance with claim 1 in which said last-mentioned means additionally includes:

(a) an amplifier for each section, and (b) means for individually adjusting the gain of each amplifier.

3. An electronic analog ear comprising:

(a) input means for providing an electrical signal in accordance with a sound to be analyzed;

(b) an analog cochlea in circuit with said input means including a predetermined number of resistance-inductance-capacitance sections simulating points along the basilar membrane of an animal cochlea for providing a plurality of electrical signals at said various sections variable in accordance with said input signal and the values of said sections to thus represent motions occurring at said points, and (c) a loudness converter associated with each of said sections for converting said plurality of electrical signals to relatively slowly varying waveforms which represent short-time average neural pulse rates at said points.

4. An electronic analog ear in accordance with claim 3 including:

(a) means for sequentially sampling said slowly varying waveforms at a predetermined rate.

5. An electronic analog ear in accordance with claim 4 in which said last-mentioned means constitutes:

(a) a high speed commutator.

6. An electronic analog ear in accordance with claim 3 including:

(a) a parallel recognition device connected to said loudness converters.

7. An electronic analog ear in accordance with claim 3 including:

(a) a summation circuit connected to said loudness converters, and (b) a loudness meter connected to said summation circuit.

8. An electronic analog ear comprising:

(a) an input device for producing a transduced electrical signal from a sound to be analyzed;

(b) an amplifier connected to said input device;

(c) an analog outer ear circuit connected to said amplifier;

(d) an analog middle ear circuit connected to said outer ear circuit;

(e) an analog cochlea circuit including a network of impedance sections simulating spaced points along the basilar membrane of an animal cochlea for providing a plurality of electrical signals varying in accordance with said transduced electrical signal and the particular values of said impedance sections to thus represent motions occurring at said spaced points, and (f) means for amplifying, detecting and filtering each of said plurality of electrical signals to produce relatively slowly varying waveforms on a spatial basis.

9. An electronic analog ear in accordance with claim 8 including:

(a) means for sequentially sampling said waveforms.

10. An electronic analog ear in accordance with claim 9 including:

(a) an oscilloscope connected to said last-mentioned means.

11. An electronic analog ear in accordance with claim 9 including:

(a) a serial recognition device connected to said last-mentioned means.

12. An electronic analog ear in accordance with claim 9 including:

(a) an average reading voltmeter for the time waveform as a loudness meter.

13. An electronic analog ear in accordance with claim 9 including:

(a) a parallel recognition device connected to said amplifying, detecting and filtering means.

14. An electronic analog ear in accordance with claim 8 including:

(a) a summation circuit connected to each said amplifying, detecting and filtering means, and (b) a loudness meter connected to said summation circuit.

15. An electronic analog ear comprising:

(a) means for converting a sound into an input electrical signal; and (b) circuit means connected to said converting means including a series array of sections simulating various spaced points along the basilar membrane of an animal cochlea for providing a plurality of output electrical signals at said sections representative of motions of the basilar membrane at said spaced points, each of said sections comprising a series branch and shunt branch, each series branch including inductance and resistance and each shunt branch including inductance, resistance and capacitance, the series inductance and the shunt capacitance in each section being larger than the corresponding quantities in the preceding section, the shunt inductance and the shunt resistance in each section being smaller than the corresponding quantities in the preceding section, and the resonant frequency of each section being lower than that of the preceding section.

16. An electronic analog ear in accordance with claim 15 in which there are 36 of said sections, each representing about 1 millimeter of distance along the basilar membrane.

17. An electronic analog ear in accordance with claim 16 in which the resonant frequency of the first of said sections is 20,000 cycles per second, resonant frequency decreasing substantially logarithmically through said sections to 100 cycles per second at the 36th section.

18. An electronic analog ear comprising:

(a) input means for providing an electrical signal in accordance with a sound to be analyzed;

(b) an analog cochlea in circuit with said input means including a predetermined number of resistance-inductance-capacitance sections simulating points along the basilar membrane of an animal cochlea for providing a plurality of electrical signals at said various sections variable in accordance with said input signal and the values of said sections to thus represent motions occurring at said points;

(c) a loudness converter associated with each of said sections for converting said plurality of electrical signals to relatively slowly varying waveforms which represent short-time average neural pulse rates at said points;

(d) means constituting a high speed commutator for sequentially sampling said slowly varying waveforms at a predetermined rate; and (e) an oscilloscope connected to said commutator.

19. An electronic analog ear comprising:

(a) input means for providing an electrical signal in accordance with a sound to be analyzed;

(b) an analog cochlea in circuit with said input means including a predetermined number of resistance-inductance-capacitance sections simulating points along the basilar membrane of an animal cochlea for providing a plurality of electrical signals at said various sections variable in accordance with said input signal and the values of said sections to thus represent motions occurring at said points;

(c) a loudness converter associated with each of said sections for converting said plurality of electrical signals to relatively slowly varying waveforms which represent short-time average neural pulse rates at said points;

(d) means constituting a high speed commutator for sequentially sampling said slowly varying waveforms at a predetermined rate; and (e) a serial recognition device connected to said commutator.

20. An electronic analog ear comprising:

(a) input means for providing an electrical signal in accordance with a sound to be analyzed;

(b) an analog cochlea in circuit with said input means including a predetermined number of resistance-inductance-capacitance sections simulating points along the basilar membrane of an animal cochlea for providing a plurality of electrical signals at said various sections variable in accordance with said input signal and the values of said sections to thus represent motions occurring at said points;

(c) a loudness converter associated with each of said sections for converting said plurality of electrical signals to relatively slowly varying waveforms which represent short-time average neural pulse rates at said points;

(d) means constituting a high speed commutator for sequentially sampling said slowly varying waveforms at a predetermined rate; and (e) an average reading voltmeter applied to the commutator output as a loudness meter.

References Cited by the Examiner

UNITED STATES PATENTS

| | | | |
|---|---|---|---|
| 3,097,349 | 7/1963 | Futzrath et al. | 179—1 |
| 3,113,187 | 12/1963 | Flanagan | 179—1 |

OTHER REFERENCES

H. F. Olson, Elements of Acoustical Engineering, D. Van Nostrand Co., Inc., New York, copyright 1947, page 459 relied on.

KATHLEEN H. CLAFFY, *Primary Examiner.*

ROBERT H. ROSE, *Examiner.*

R. MURRAY, *Assistant Examiner.*